(12) United States Patent
Xie et al.

(10) Patent No.: US 11,210,010 B2
(45) Date of Patent: Dec. 28, 2021

(54) DATA MIGRATION IN A MULTI-TIERED STORAGE SYSTEM

(71) Applicant: International Business Machines Corporation, Armonk, NY (US)

(72) Inventors: Qiang Xie, Shanghai (CN); Hui Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 16/526,578

(22) Filed: Jul. 30, 2019

(65) Prior Publication Data

US 2021/0034271 A1    Feb. 4, 2021

(51) Int. Cl.
    *G06F 3/06*    (2006.01)

(52) U.S. Cl.
    CPC ............ *G06F 3/0647* (2013.01); *G06F 3/067* (2013.01); *G06F 3/0611* (2013.01); *G06F 3/0656* (2013.01)

(58) Field of Classification Search
    None
    See application file for complete search history.

(56) References Cited

U.S. PATENT DOCUMENTS

| | | | | |
|---|---|---|---|---|
| 8,751,725 | B1 * | 6/2014 | Gangadharan | G06F 3/068 711/100 |
| 9,477,551 | B1 * | 10/2016 | Piszczek | G06F 3/0617 |
| 9,667,719 | B1 * | 5/2017 | Bent | H04L 67/06 |
| 10,108,644 | B1 | 10/2018 | Wigmore et al. | |
| 10,359,941 | B1 * | 7/2019 | Bent | G06F 3/0641 |
| 10,454,751 | B1 * | 10/2019 | Bent | H04L 67/1097 |
| 2013/0297894 | A1 * | 11/2013 | Cohen | G06F 12/00 711/154 |
| 2014/0108759 | A1 * | 4/2014 | Iwamitsu | G06F 3/0604 711/165 |
| 2016/0283129 | A1 | 9/2016 | Wang et al. | |
| 2018/0241819 | A1 | 8/2018 | Huselton et al. | |
| 2018/0276263 | A1 * | 9/2018 | Voigt | G06F 16/2246 |
| 2019/0243557 | A1 * | 8/2019 | Joshi | G06F 3/061 |

FOREIGN PATENT DOCUMENTS

GB    2545985 A    7/2017

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

*Primary Examiner* — Charles Rones
*Assistant Examiner* — Ryan Dare
(74) *Attorney, Agent, or Firm* — Jorge R. Maranto

(57) ABSTRACT

A method and a system for data migration on a multi-tiered storage system are provided. The method can include receiving a migration task indicating a dataset to migrate. The method can further include building a plurality of buffers onto at least one high-performance storage tier. The high-performance storage tier can be based on the read speed of that tier. The method can also include referencing a shadow mapping to locate physical data from the dataset stored on a first buffer. The method can include migrating the physical data from the first buffer to a migration destination. The method can further include deallocating the first buffer. The deallocation can allow allocation of additional physical data onto the first buffer for migration.

18 Claims, 7 Drawing Sheets

DATA MIGRATION IN A MULTI-TIERED STORAGE SYSTEM

BACKGROUND

The present disclosure relates to data migration, and more specifically, to data migration from a multi-tiered storage system to a requested destination by implementing buffers to expedite the process.

Data migration is a process of selecting, preparing, extracting, transforming, and transferring data from one storage system to another. Selecting a destination to migrate data can be determined based on performance, long term storage requirements, or for some other business need. Datasets moved are typically prepared in such a way as to allow the datasets to be accessed in the new destination. The preparation may be necessary due to incompatibilities between the data and the new destination. Once prepared, a time can be selected, and the migration process can begin. Depending on the amount of data to be transferred, the time needed to perform the migration process can range from hours to several days.

SUMMARY

Various embodiments are directed to a method of migrating data from buffers located on high-performance storage tiers within a storage system. The method includes receiving a migration task indicating a dataset to migrate. The method further includes building a plurality of buffers onto at least one high-performance storage tier. The high-performance storage tier can be based on the read speed of that tier. The method also includes referencing a shadow mapping to locate physical data from the dataset stored on a first buffer. The method includes migrating the physical data from the first buffer to a migration destination. The method further includes deallocating the first buffer. The deallocation can allow allocation of additional physical data onto the first buffer for migration.

Further embodiments are directed to a computer program product for migrating data from buffers located on high-performance storage tiers within a storage system. The computer program product includes instructions to cause the system to receive a migration task indicating a dataset to migrate. The instructions further cause the system to build a plurality of buffers onto at least one high-performance storage tier. The high-performance storage tier can be based on the read speed of that tier. The instructions also cause the system to reference a shadow mapping to locate physical data from the dataset stored on a first buffer. The instructions also cause the system to migrate the physical data from the first buffer to a migration destination. The instructions further cause the system to deallocate the first buffer. The deallocation can allow allocation of additional physical data onto the first buffer for migration.

Additional embodiments are directed to a system, which can include at least one processing component and at least one memory component, for migrating data from buffers located on high-performance storage tiers within a storage system. The system also includes storage tiers, storage locations, a storage controller, a migrator, a tier analyzer, and a shadow mapping. The memory component can also include program instructions which cause the system to receive a migration task indicating a dataset to migrate. The instructions can further cause the system to build a plurality of buffers onto at least one high-performance storage tier. The high-performance storage tier can be based on the read speed of that tier. The instructions can also cause the system to reference a shadow mapping to locate physical data from the dataset stored on a first buffer. The instructions can cause the system to migrate the physical data from the first buffer to a migration destination. The instructions can further cause the system to deallocate the first buffer. The deallocation can allow allocation of additional physical data onto the first buffer for migration.

BRIEF DESCRIPTION OF THE DRAWINGS

These and other features, aspects, and advantages of the embodiments of the disclosure will become better understood with regard to the following description, appended claims, and accompanying drawings where:

Figure 1:
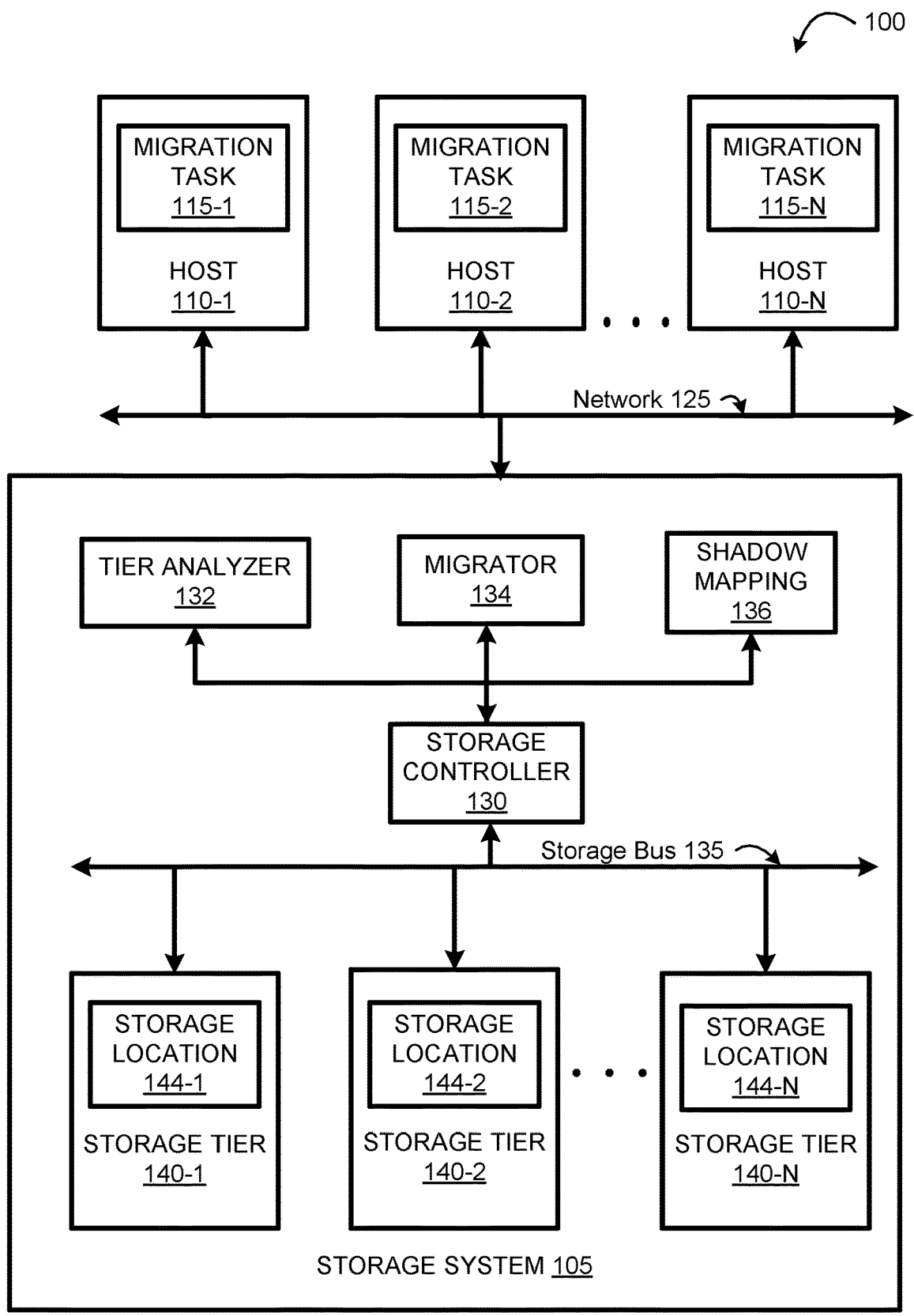
FIG. 1 is a block diagram illustrating a storage environment for implementing a multi-tiered storage system, according to embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numeral are used to designate like parts in the accompanying drawings.

DETAILED DESCRIPTION

Data migration can be described as the transferring of data between storage system types, formats or computer systems. Migration of data may be warranted when an organization upgrades a storage system, when performance issues need to be resolved, when certain data needs to be preserved in accordance with company policy, as well as for many other reasons. However, migrating data can be a disruptive process that can affect the normal operations of a system. Many factors are taken into consideration when attempting to migrate data. One important factor to be considered is the amount of time needed to complete the migration process. If an offline migration is required, data can remain unavailable for an extended period of time, ranging from several hours to days.

Migrating data from an existing storage system to a destination, such as another storage system, can be accomplished through various techniques. These techniques include migration based on physical volumes and migration based on logical datasets. Physical volume migration typically requires the same device geometry on the source and on the target volumes. This can result in additional complications that require more time to resolve. Logical dataset migration maintains catalog entries according to data movement between volumes. As such, it is not a volume-based migration. Dataset migration can also support multivolume datasets and does not rely on volume characteristics or on-device geometries.

To expedite the migration process, and to minimize possible system down time, disclosed herein are a method and a system for data migration from a multi-tired storage system using buffers on high-performance storage tiers. The method can include receiving a migration task indicating a dataset to migrate. The method can further include building a plurality of buffers onto at least one high-performance storage tier. The high-performance storage tier can be based on the read speed of that tier. The method can also include referencing a shadow mapping to locate physical data from the dataset stored on a first buffer. The method can include migrating the physical data from the first buffer to a migration destination. The method can further include deallocating the first buffer. The deallocation can allow allocation of additional physical data onto the first buffer for migration.

A dataset can refer to a file containing one or more records, where a record can be a basic unit of information. Any named group of records can be considered a dataset. Also, a record can collect related information treated as a unit. This can include items in a database, personnel data, as well as other types of information organized into units. Datasets can be used to store information needed by applications or the operating system itself. This type of data can include data such as source programs, program libraries, system variables, or parameters. A dataset can also be cataloged to permit the dataset to be referred to by name without specifying where the data is physically stored. The dataset can also be of various type. These types can include a sequential dataset, a partitioned dataset, and a virtual storage access method (VSAM) dataset.

FIG. 1 is a block diagram illustrating a migration system 100 for migrating data, according to embodiments of the present disclosure. The migration system 100 includes one or more hosts 110-1, 110-2, 110-N (collectively "host 110"), where N is a variable integer representing any number of possible hosts 110, with migration tasks 115-1, 115-2, 115-N (collectively "migration task 115"), a network 125, and a storage system 105. The host 110 is communicatively coupled to the storage system 105 over the network 125. The storage system 105 can include a storage controller 130, a storage bus 135, and one or more storage tiers 140-1, 140-2, 140-N (collectively "storage tier 140"). The storage controller is communicatively coupled with the storage tier 140 over the storage bus 135. In some embodiments, the storage system 105 includes a tier analyzer 132, a data migrator 134, and a shadow mapping 136. In some embodiments, the storage tier 140 includes a storage location 144-1, 144-2, and 144-N (collectively "storage locations 144"). In some embodiments, the migration system 100 is included within or embodied by a computer system, described below.

The storage system 105 is a component of the migration system 100 configured to consolidate, manage, and operate data storage. In some embodiments, the storage system 105 is a server or an aggregation of servers. Examples of the storage system 105 include storage servers (e.g., block-based storage), direct attached storage, file servers, server-attached storage, network-attached storage, or any other storage solution. In some embodiments, the components of the storage system 105 are implemented within a single device. In some other embodiments, the components of the storage system 105 comprise of a distributed architecture. For example, the storage system 105 can comprise of multiple storage tiers 140 physically located at different locations but are able to communicate over a communication network to achieve a desired result.

The host 110 is a component of migration system 100 configured to provide migration tasks 115 and commands to the storage system 105. In some embodiments, the host 110 is a server (e.g., WINDOWS, Power Systems, IBM I, UNIX, and System Z), a personal computer (e.g., desktop, laptop, and tablet), or any device capable of communicating over a network. The migration task 115 can include multiple datasets containing data located on multiple storage tiers. The host 110 providing the migration task 115 can request data for migration that is within the operation and control of that host 110. In some embodiments, an administrator provides a migration task 115 to the storage system 105.

The network 125 is a component of migration system 100 configured to facilitate direct, high-speed data transfers and communication between the host 110 and the storage system 105. In some embodiments, the network 125 is an internal bus. In some embodiments, the network 125 is an external bus. Examples of the network 125 include a local area network (LAN), a wide area network (WAN), a storage area network (SAN), intranet, or any combination thereof.

The storage controller 130 is a component of storage system 105 configured to manage the input and output of data from the network 125 to the storage tiers 140. Data can be stored and manipulated depending on the needs of the storage system 105. In some embodiments, the storage controller 130 arranges and configures the storage locations 144 in a redundant array of independent disks (RAID) configuration. For example, data stored within the storage system 105 can be striped across all configured storage locations 144 and possibly across the storage tiers 140. Various RAID configurations also offer techniques such as striping, mirroring, and providing parity bits of data. The storage controller 130 is also configured to manage how the data, received by the storage system 105, is stored and retrieved. For example, in tier-based storage configurations, data is placed in storage tiers 140 best suited for the type of data that is received.

The tier analyzer 132 is a component of storage system 105 configured to analyze the storage tiers 140 and determine the read speed, I/O, as well as various other characteristics of the storage tiers 140. Based on the characteristics of the storage tiers, the tier analyzer can also rank each tier. For example, a storage tier 140 comprising of solid-state drives may have high read speeds. Thus, the tier analyzer 132 can rank the solid-state tier as a high-performance storage tier. A storage tier 140 comprising of tape drives may have a lower read speed and can be ranked as a lower-performance storage tier. While shown as a separate component in FIG. 1, it should be understood that the tier analyzer 132 may be arranged as part of the storage controller 130 or any other suitable component of the storage system 105. In some embodiments, the tier analyzer 132 receives a predetermining ranking for the storage tiers 140. For example, a host 110, or an administrator, may label a given storage tier 140 as a high-performance based on prior knowledge or based on some other predetermined reasoning.

The migrator 134 is a component of storage system 105 configured to receive and initiate migration tasks 115 sent to the storage system 105. While shown as a separate component in FIG. 1, it should be understood that the migrator 134 may be arranged as part of the storage controller 130 or any other suitable component of the storage system 105. The migrator 134 is can also initiate migration tasks based on the type of migration requested. These types of migrations can include host-based migrations, array-based migrations, appliance-based migrations, and migrations from backups.

The shadow mapping 136 is a component of storage system 105 configured to store mappings for the data stored in the storage tiers 140 that is to be migrated. While shown in FIG. 1 as a mapping, the shadow mapping 136 can be a table, a database, a journal, or metadata. The shadow mapping 136 can include information that provides the migrator 134 with pointer information for the data to be migrated from a buffer to a migration destination. In some embodiments, the shadow mapping 136 includes information on the size of the data, the location of the data, the data type of the data, and the read speed of the storage tier 140 that has buffered the data.

In some embodiments, upon migration, the shadow mapping 136 is configured to delete entries once migration occurs for that entry. For example, a segment of data could be mapped from storage tier 140-1 to a first buffer. Once the migrator 134 migrates the segment of data from the buffer to a requested destination, the entry for that segment of data can be deleted. This allows for the shadow mapping 136 to only show mappings of data that still require migration.

The storage bus 135 is a component of storage system 105 configured to facilitate direct, high-speed transfer and communication between the storage tiers 140, either directly or through the storage controller 130. In some embodiments, the storage bus 135 is an internal bus. In some other embodiments, the storage bus 135 is an external bus. In some embodiments, the storage bus 135 enables data to be moved without server intervention, therefore freeing up processing cycles on the server end. For example, a disk device can back up its data to a tape device as needed without receiving a command from a server or controller. Examples of the storage bus 135 include a LAN, a WAN, a Fibre Channel (FC), and any combination thereof. In some embodiments, implementations interconnect together into many network configurations capable of communicating over long distances. The storage bus 135 is configured to transfer data utilizing a variety of standards. Some standards include the Small Computer System Interface (SCSI), Fibre Channel, fiber connection (FICON), and Internet Protocol (IP) standards.

The storage tier 140 is a component of storage system 105 configured to store and manage the input and output of data on the storage system 105. Examples of storage tiers 140 include tape systems (e.g., tape drives, tape autoloaders, tape libraries), disk systems, storage arrays, magnetic drives, solid-state drives, and optical drives. In some embodiments, the storage tiers 140 include at least one storage location 144. A storage location 144 is a component of the storage tier 140 configured to be a logical unit of physical storage. Examples of storage locations 144 include RAID arrays from internal storage or volumes from external storage. A storage location 144 can comprise of multiple physical disks presented as a single logical disk to the network 125 and host 110.

Figure 2:
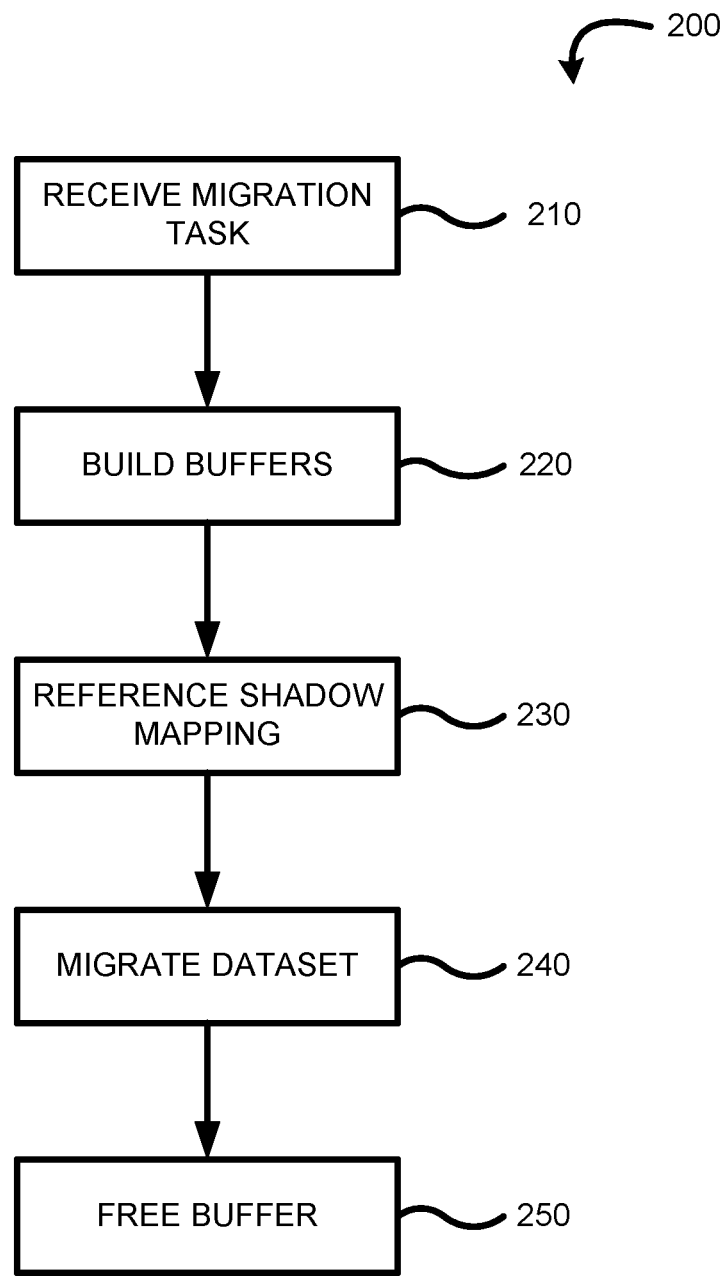
FIG. 2 is a flow diagram illustrating a process of migrating a dataset using buffers, according to embodiments of the present disclosure.

FIG. 2 is a flow diagram illustrating a process 200 of migrating a dataset using buffers, according to embodiments of the present disclosure. The migrator 134 receives a migration task 115 from a host 110. This is illustrated at step 210. The migration task 115 can include one or more datasets to be migrated from the storage system 105 to a requested destination. In some embodiments, the datasets are logical datasets that indirectly point to data stored on the storage locations 144. The storage controller 130 can maintain a mapping between the logical locations provided by the host 110 with the physical locations where the requested data is stored. The datasets included in the migration task can include multiple records spread across multiple storage tiers 140. For example, a migration task 115 can include migration requests of data stored in storage tier 140-1 as well as storage tier 140-2. Typically, the physical location of the data is abstracted away from the host as the storage system 105 distributes data based on optimizations provided by an administrator. As such, a mapping is used to point from the storage system 105 to the physical location of the data within the dataset.

Once the migration task is received, the storage system 105 builds buffers on high-performance storage tiers stored on the storage system 105. This is illustrated at step 220. In some embodiments, the number of buffers created on the high-performance storage tiers is based on the ratio between the read speeds of the high-performance storage tiers and the lower-performance storage tiers. In some embodiments, the number of buffers created is decided in such a way as to allow the buffers to be written to and read from continuously throughout the migration process. This can be illustrated by Equations 1-4. In one embodiment, the time required to read a chunk of data from a lower-performance storage tier and to write that data onto a buffer of a high-performance storage tier is determined using equation (1) as shown:

$$T = \frac{S}{R_L} + \frac{S}{W_H} \quad \text{Equation 1}$$

The parameter T indicates the time transfer a chunk of data of size S from one tier to another tier. $R_L$ indicates the read speed of a low-performance storage tier where the chunk of data of size S is physically located. $W_H$ indicates the write speed of a high-performance storage tier where the chunk of data of size S is written to. During the period in which the chunks of data are being written to, in some embodiments, data can also be read from the buffers located on the high-performance storage tier as determined using equation (2) as shown:

$$D = R_H T = R_H \left( \frac{S}{R_L} + \frac{S}{W_H} \right) = \frac{R_H S}{R_L} + \frac{R_H S}{W_H} \quad \text{Equation 2}$$

The parameter D indicates the read speed, or copy rate, from the high-performance storage tier for the chunk of data of size S. D can be represented as the read speed for the high-performance storage tier $R_H$ multiplied by T from Equation 1. Represented another way, D can be calculated as the read speed of the high-performance storage tier multiplied by the data chunk size S and divided by the read speed of the lower-performance storage tier. This can be added to the read speed of the high-performance tier multiplied by the data chunk size S and divided by the write speed of the high-performance storage tier. During this period, the ratio of data copied to the high-performance storage tier and data migrated from the high-performance tier can be determined from equation (3), as shown:

$$S : D = S : \left( \frac{R_H S}{R_L} + \frac{R_H S}{W_H} \right) = 1 : \left( \frac{R_H}{R_L} + \frac{R_H}{W_H} \right) \quad \text{Equation 3}$$

If the data chunk size S is set to 1, the number of buffers can be calculated using equation (4), as shown:

$$ROUNDUP\left(\frac{R_H}{R_L} + \frac{R_H}{W_H}\right) + 1 \qquad \text{Equation 4}$$

The determination of the read speed of the high-performance storage tier divided by the read speed of the low-performance storage tier added to the read speed of the high-performance storage tier divided by the write speed of the high-performance storage tier plus one for the data chunk size can be rounded up. The determination can then be set as the number of buffers to build. By determining the number of buffers, the buffers can continuously migrate data and build buffers without needing to pause the migration to let the buffers build.

The storage controller 130 references the shadow mapping 136 to begin the migration process. This is illustrated at step 230. The shadow mapping includes a mapping of the data located on the physical storage locations 144 and buffered onto buffers located on a high-performance storage tier. For example, a dataset could be physically located within storage location 144-1 of storage tier 140-1. That same dataset could also have been buffered onto storage tier 140-2 for migration. In some embodiments, the shadow mapping includes a mapping from the logical representation of the dataset provided by the migration task to the physical location of the dataset located on the storage locations 144. By including a mapping of the logical location, the migration process need only reference the shadow mapping to determine the location of the dataset.

The migrator 134 migrates the datasets requested in the migration task 115. This is illustrated at step 240. The migration process can proceed sequentially as referenced in the migration task 115. If the dataset is physically located on a high-performance storage tier, the dataset does not need to be buffered and can be transferred directly from its physical storage location 144. However, if the dataset is physically located on a lower-performance storage tier, the migrator 134 can reference the shadow mapping and migrate the dataset from a buffer located on a high-performance storage tier. The faster read speeds of the high-performance storage tier can improve the transfer rate of the migration whereby the overall migration process time can be reduced.

Once the dataset is migrated from a buffer, that buffer can deallocated the buffered data to be able to allocate additional data for migration. This is illustrated at step 250. In some embodiments, each buffer is allocated data at the start of the migration process. Once buffers are allocated data, the migration procedure can migrate the buffered data sequentially. For example, if five buffers are generated to assist in the migration process, all five buffers are allocated data. The migration process begins by migrating data from the first buffer as the other buffers wait for their data to be migrated. Once the migration is completed on the first buffer, migration can begin on the second buffer. The data stored on the first buffer can be deallocated and additional data can be written to the first in parallel with the migration of data from the subsequent buffers.

Figure 3:
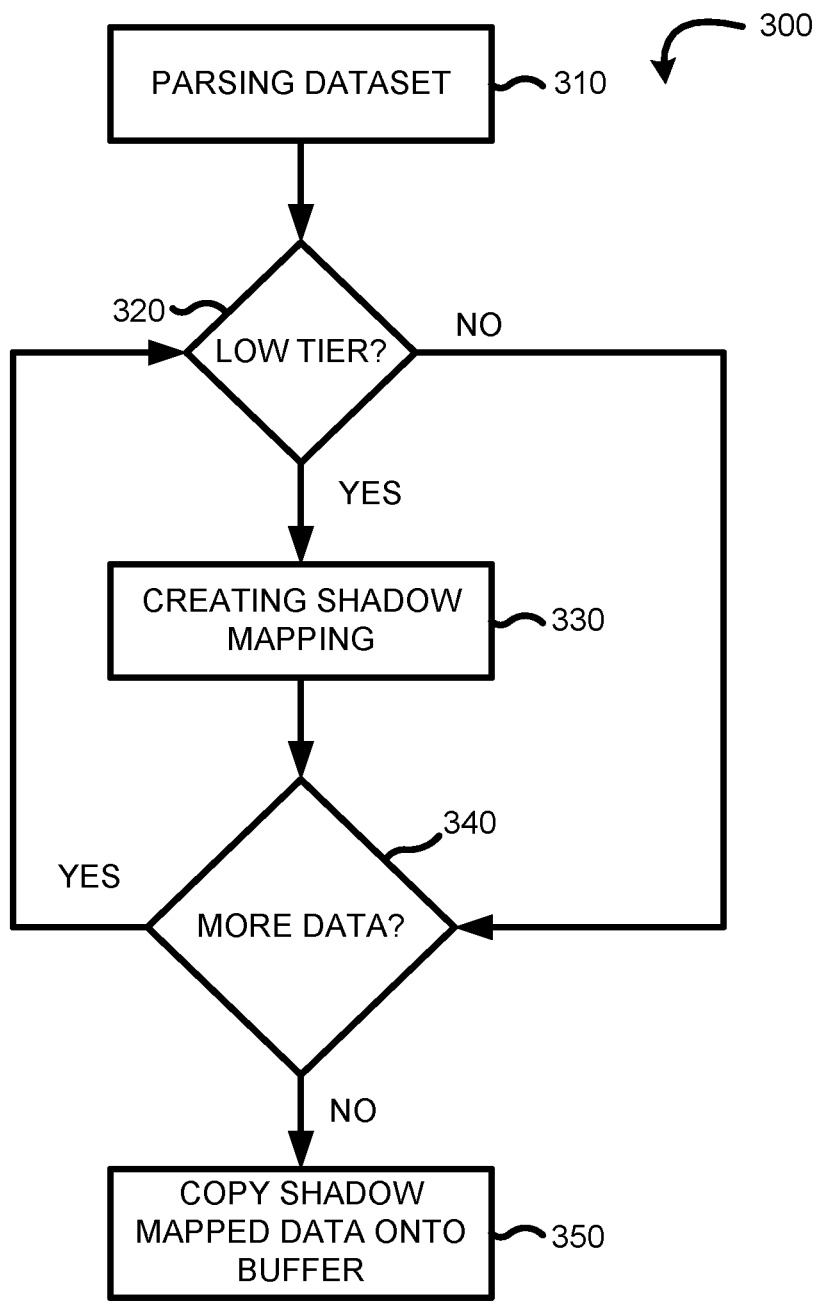
FIG. 3 is a flow diagram illustrating a process of generating a shadow mapping and copying data onto buffers, according to embodiments of the present disclosure.

FIG. 3 is a flow diagram illustrating a process of generating a shadow mapping and copying data onto buffers, according to embodiments of the present disclosure. In some embodiments, the process 300 comprises or incorporates one or more steps of the process 200. For example, the steps of process 300 my comprise all, part, or sub-operations of step 220 of process 200.

The dataset referenced in the migration task 115 is parsed to determine the physical location of the data. This is illustrated at step 310. A dataset can include data spread across multiple storage locations 144 on multiple storage tiers 140. By parsing the physical data by location, the storage system 105 can determine which storage tier 140 the physical data is located on. For example, a dataset may have references to physical data located at storage location 144-1 as well as 144-2. The physical data is parsed between the two physical locations because they are located on different storage tiers 140. This can be due to the storage tiers 140 having differing performance designations. The storage tier 140-1 may have a designation as a high-performance storage tier based on the read speed of that tier. The storage tier 140-2 may have a designation as a lower-performance storage tier due to its lower read speed or due to some other characteristic of that tier. Since the tiers are of different designation, the data on those tiers are handled differently during the migration process. The physical data stored on the lower-performance storage tiers can be buffered onto high-performance storage tiers prior to migration while the physical data already stored on the high-performance storage tier can be migrated directly from its storage location 144. If the data is determined to be physically located on a high-performance storage tier, that data need not be placed as an entry on the shadow mapping.

Once parsed, the physical data can be analyzed to determine if it is located on lower-performance storage tier 140. This is illustrated at step 320. The tier analyzer 132 can provide an analysis of the storage tiers 140 and designate which storage tiers 140 are designated as high-performance storage tiers and which storage tiers 140 are designated as lower-performance storage tiers. In one embodiment, the assigned designations are based on an analysis of the read speeds of the storage tiers 140. The tier analyzer 132 can determine the read speeds of each tier and designate one or more storage tiers with faster read speed performances. However, the analysis of the storage tiers 140 can be conducted several ways and is not limited to the read speeds of the storage tiers 140. Based on the analysis provided by the tier analyzer, if the data is physically located in a lower-performance storage tier, the process can proceed with shadow mapping 136 that data.

If the parsed data is determined to be located on a lower-performance storage tier, a shadow mapping 136 for that data is created. This is illustrated at step 330. The shadow mapping 136 can be updated to reflect the buffer for which the data will be migrated from. For example, if three buffers are generated for the purposes of migration, data can be assigned to a first buffer of the three buffers. In this instance, the shadow mapping 136 reflects that the data is buffered onto the first buffer. Once that data is ready for migration, the data can be read from the first buffer and not from physical storage location 144 where the data is permanently stored.

The parsed dataset is further analyzed to determine if any more data requires evaluation. This is illustrated at step 340. A parsed dataset can contain multiple pieces of data spread across multiple storage tiers 140. Each piece of data requires an analysis to determine whether the data is located on a lower-performance storage tier, and if so, to create a shadow mapping for that data. At this step, the process 300 checks to determine if anymore data requires the analysis. If there remains unanalyzed data left in the dataset, the process 300 can return to step 320 to conduct the analysis on the data. However, if all the data has been analyzed, the process 300 can proceed to step 350.

A copy of the data mapped to the shadow mapping 136 is created. This is illustrated at step 350. The shadow mapping 136 provides a mapping to a designated buffer for which the data can be copied to. Based on the shadow mapping 136, the data can be copied onto its assigned buffer. Each piece of data that had a shadow mapping created for it is also copied onto the buffers as space permits. Once the buffers are populated, the migration process can proceed, as buffers become available, additional data can be mapped to the buffers and subsequently populated.

In some embodiments, each buffer is allocated data in parallel. A computation thread can be assigned to each buffer, where each computation thread copies data from the storage location 144 to their assigned buffers. For example, if four buffers are generated for the migration process, each of the four buffers will be populated with data at the same time during the initial start of the migration process. As the migration proceeds, the buffers that have been deallocated data can have a computation thread assigned to them to populate additional data while other buffers are having their data migrated.

Figure 4:
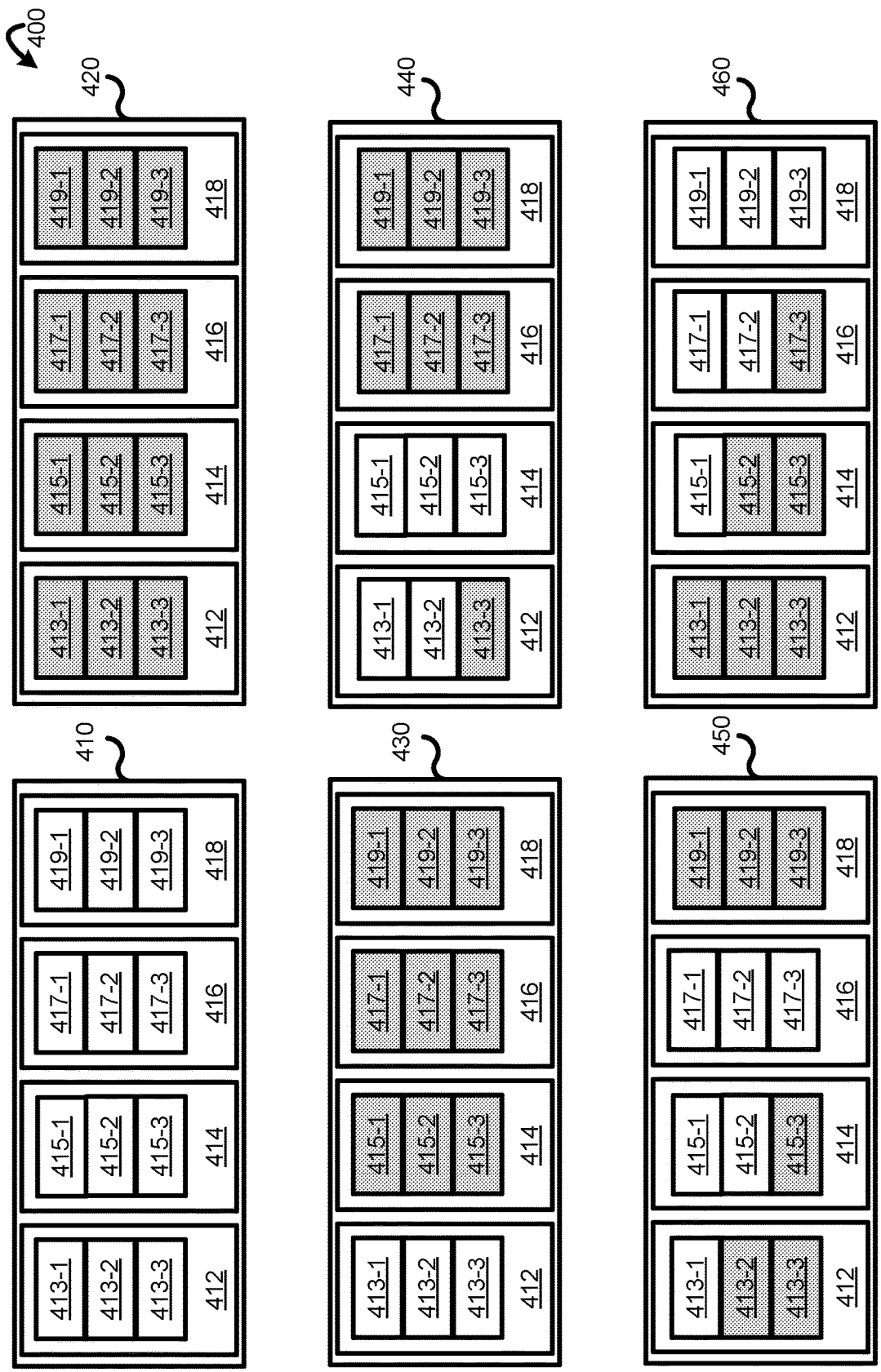
FIG. 4 is a block diagram illustrating the allocation and deallocation of data onto buffers within a buffering environment, according to embodiments of the present disclosure.

FIG. 4 is a block diagram illustrating the allocation and deallocation of data onto buffers in a buffering environment 400, according to embodiments of the present disclosure. The buffering environment 400 includes a first buffering operation 410, a second buffering operation 420, a third buffering operation 430, a fourth buffering operation 440, a fifth buffering operation 450, and a sixth buffering operation 460. Also included are buffers 412, 414, 416, and 418. In some embodiments, buffer 412 includes segments 413-1, 413-2, and 413-3, buffer 414 includes segments 415-1, 415-2, and 415-3, buffer 416 includes segments 417-1, 417-2, and 417-3, and buffer 418 includes segments 419-1, 419-2, and 419-3. In some embodiments, the buffering environment 400 is included within or embodied by a computer system, described below. Although described with distinct components, it should be understood that, in at least some embodiments, components may be combined or divided, or additional components (e.g., more or less buffers and segments) may be added, without departing from the scope of the present disclosure.

The first buffering operation 410 is the initial operation to begin the buffering process. Each buffer 412, 414, 416, and 418 has been generated and divided into three equally sized segments for allocating data. During the first buffering operation 410, no data has been allocated, or copied, onto the segments.

The second buffering operation 420 illustrates buffers 412, 414, 416, and 418 having been populated with data. The segments which have been populated with data is illustrated by a gray shading. To populate the data, four computation threads may have been assigned to each of the buffers and each thread has allocated data using the shadow mapping 136 in parallel with each other.

The third buffering operation 430 illustrates the start of the migration process. The buffers 412, 414, 416, and 418 have been allocated data and the migrator 134 can begin migrating data from the buffer 412. The data contained within segment 413-1, 413-2, and 413-3 has been migrated and buffer 412 can now receive additional data as the previously stored data has now been deallocated.

The fourth buffering operation 440 illustrates the continued migration process with additional data being added. The data contained within segments 415-1, 415-2, and 415-3 of buffer 414 has been migrated. While the migration process occurs on buffer 414, buffer 412 can receive additional data. A computation thread begins to populate segment 413-3 with data for migration. Typically, read rates on storage devices are faster than write rates. As such, the fourth buffering operation 440 illustrates this read to write ratio by having three segments read to one segment being written. It should be noted, however, that different read to write ratios can exist for each storage tier 140. Having the appropriate number of buffers to continuously migrate allocated data can improve the overall performance of the migration process.

The fifth buffering operation 450 illustrates the migration process as it proceeds to the next buffer. The data contained within segments 417-1, 417-2, and 417-3 of buffer 416 has been migrated. As the migration is performed on buffer 416, buffer 412 continues to receive additional data and segment 413-2 has been allocated data. Also, buffer 414 can also receive additional data from a separate computation thread. Thus, segment 415-3 has been allocated data. The write operations to buffers 412 and 414 occur simultaneously to the migration of data from buffer 416.

The sixth buffering operation 460 illustrates the migration process as it migrates data from the fourth buffer. The number of buffers generated for this particular migration process allows for continuous migration without the need to pause while the buffers are allocated data. Buffer 412 has completed its allocation process during the migration of data on buffer 418. The migration can continue to iterate through each of the buffers until all of the requested data has been migrated.

Figure 5:
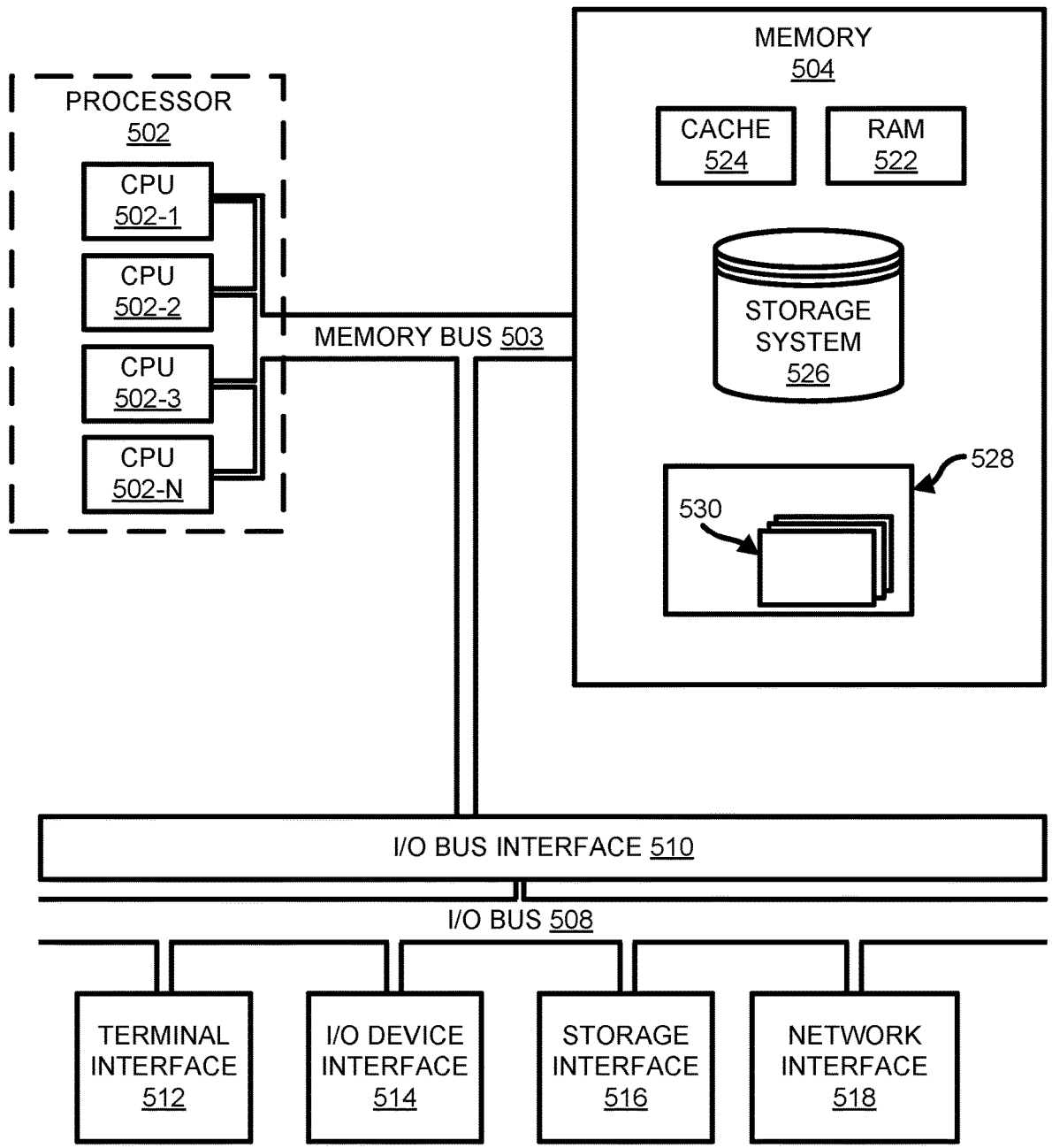
FIG. 5 is a high-level block diagram illustrating an example computer system that may be used in implementing one or more of the methods, tools, and modules, and any related functions, described herein, according to embodiments of the present disclosure.

Referring now to FIG. 5, shown is a high-level block diagram of an example computer system 500 (e.g., storage system 105) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more processors 502, a memory 504, a terminal interface 512, a I/O (Input/Output) device interface 514, a storage interface 516, and a network interface 518, all of which may be communicatively coupled, directly or indirectly, for inter-component communication via a memory bus 503, a I/O bus 508, and an I/O bus interface 510.

The computer system 500 may contain one or more general-purpose programmable central processing units (CPUs) 502-1, 502-2, 502-3, and 502-N, herein generically referred to as the processor 502. In some embodiments, the computer system 500 may contain multiple processors typical of a relatively large system; however, in other embodiments the computer system 500 may alternatively be a single CPU system. Each processor 502 may execute instructions stored in the memory 504 and may include one or more levels of on-board cache. In some embodiments, the processor 502 executes the processes included herein (e.g., process 200, 300).

The memory 504 may include computer system readable media in the form of volatile memory, such as random-access memory (RAM) 522 or cache memory 524. Computer system 500 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the processors 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units, multiple I/O buses, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
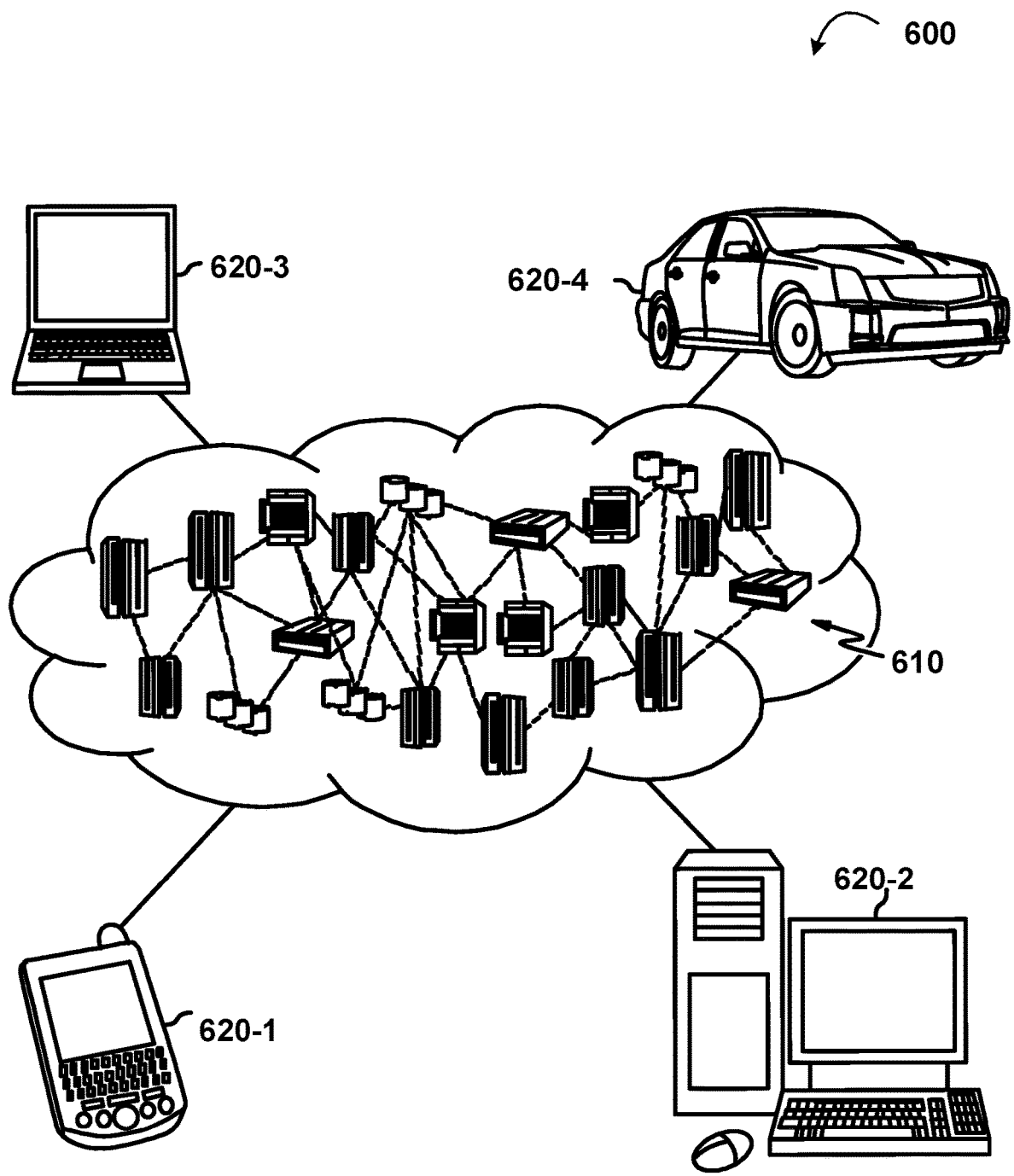
FIG. 6 depicts a cloud computing environment according to an embodiment of the present disclosure.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 620-1, desktop computer 620-2, laptop computer 620-3, and/or automobile computer system 620-4 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620-1-4 shown in FIG. 6 are intended to be illustrative only and that computing nodes 610 and cloud computing environment 600 can communicate with any type of computerized device over any type of network and/or network addressable connection (e.g., using a web browser).

Figure 7:
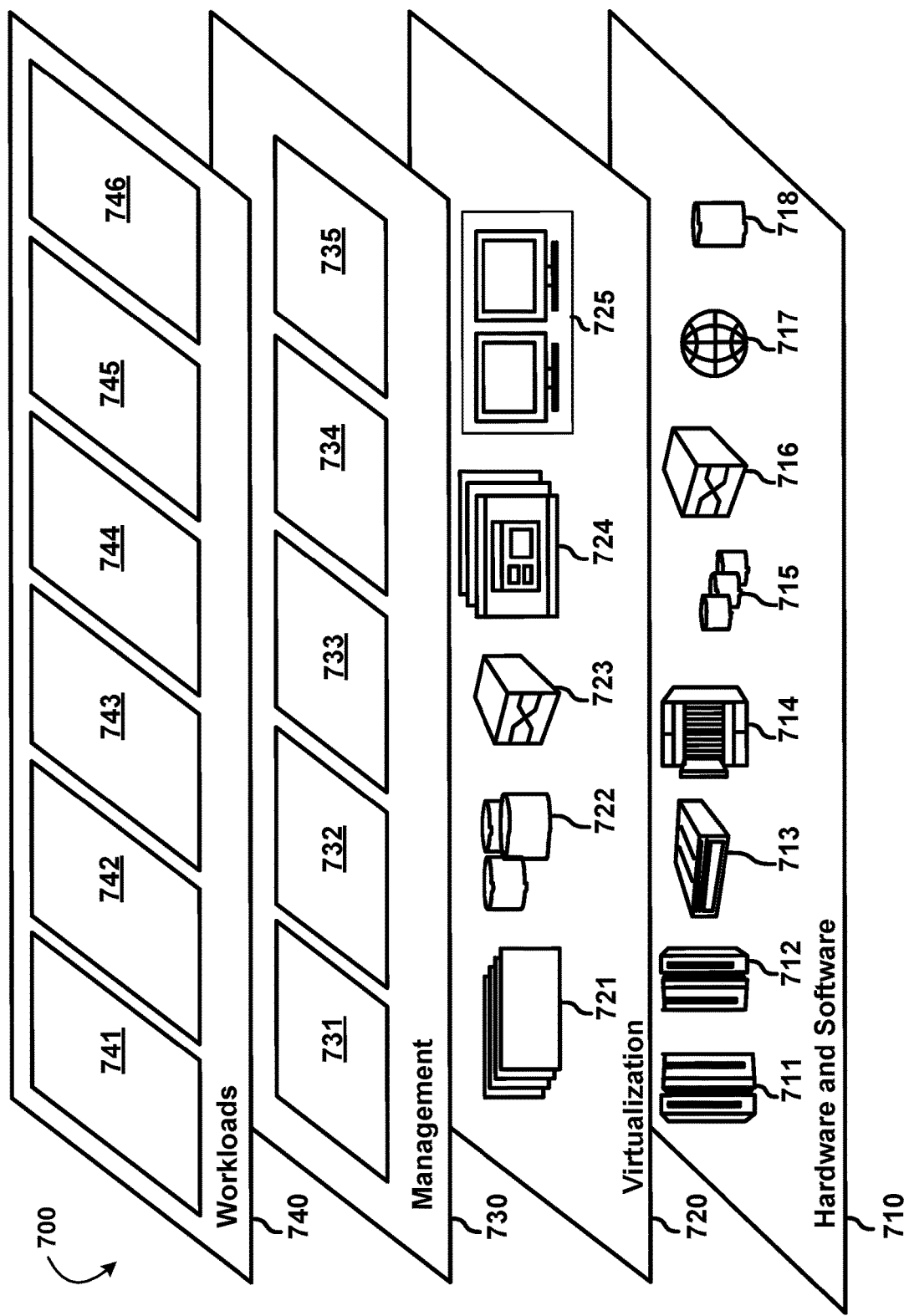
FIG. 7 depicts abstraction model layers according to an embodiment of the present disclosure.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 710 include hardware and software components. Examples of hardware components include: mainframes 711; RISC (Reduced Instruction Set Computer) architecture based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 may provide the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (SLA) planning and fulfillment 735 provide pre-arrangement for, and procurement of, cloud computing resources for which a future requirement is anticipated in accordance with an SLA.

Workloads layer 740 provides examples of functionality for which the cloud computing environment may be utilized. Examples of workloads and functions which may be provided from this layer include: mapping and navigation 741; software development and lifecycle management 742; virtual classroom education delivery 743; data analytics processing 744; transaction processing 745; and migrating a dataset from a multi-tiered storage system using buffers allocated on high-performance tiers 416.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a storage system configured to maintain data stored, wherein the storage system includes a plurality of storage tiers where the data are stored;
a tier analyzer configured to assign designations to the storage tiers based on their characteristics;
a storage controller configured to build buffers on the storage tiers with high-performance designations determined by the tier analyzer, wherein storage controller builds the buffers by:
parsing a dataset to determine tier locations for the data in the dataset,
selecting lower-tiered data from the physical data in the dataset;
creating the plurality of buffers in the high-performance storage tier,
determining the shadow mapping for the lower-tiered data placed in the buffers, wherein the shadow mapping includes pointers to the buffers storing the lower-tiered data, and
copying the physical data onto the buffers,
the storage controller further configured to allocate the data to the buffers; and
a migrator configured to receive migrations tasks and to migrate the data from the storage tiers to a requested destination.

2. The system of claim 1, wherein the migrator is further configured to reference a shadow mapping while conducting a migration, wherein the shadow mapping directs the migrator to the data allocated to the buffers.

3. The system of claim 1, wherein a number of buffers the storage controller builds is determined by a ratio between read speeds of the storage tiers designated as high-performance and read speeds of the storage tiers designated as lower-performance.

4. The system of claim 1, further comprising:
a plurality of computation threads configured to allocate the data to the buffers,
wherein at least one computation thread is assigned to each of the buffers.

5. The system of claim 4, wherein the computation threads allocate the data to the buffers in parallel during a migration process.

6. The system of claim 1, wherein the tier analyzer assigns designations to the storage tiers based on read speeds of the storage tiers.

7. A method comprising:
receiving a migration task indicating a dataset to migrate;
building a plurality of buffers onto at least one high-performance storage tier, including:
parsing the dataset to determine tier locations for the physical data in the dataset,
selecting lower-tiered data from the physical data in the dataset;
creating the plurality of buffers in the high-performance storage tier,
determining the shadow mapping for the lower-tiered data placed in the plurality of buffers, wherein the shadow mapping includes pointers to the plurality of buffers storing the lower-tiered data, and
copying the physical data onto the plurality of buffers;
referencing a shadow mapping to locate physical data from the dataset stored on a first buffer from the plurality of buffers;
migrating the physical data from the first buffer to a migration destination; and
deallocating the first buffer to allow allocation of additional physical data onto to the first buffer for migration.

8. The method of claim 7, wherein a number of buffers created is determined by a ratio of a read speed of the high-performance storage tier and a read speed of a lower-performance storage tier.

9. The method of claim 7, wherein the shadow mapping includes references to the physical data physically copied onto the buffers.

10. The method of claim 7, wherein copying the lower-tiered data comprises copying the lower-tiered data onto each of the buffers in parallel.

11. The method of claim 7, further comprising:
copying the additional physical data to be migrated onto the first buffer; and
migrating the physical data stored in a second buffer referenced by the shadow mapping.

12. The method of claim 7, further comprising:
transmitting a completion command to a host upon determining the physical data in the dataset is completely transferred.

13. A computer program product for migrating data, the computer program product comprising a computer readable storage medium having program instruction embodied therewith, the program instructions executable by a processor to cause the processor to:
receive a migration task indicating a dataset to migrate;
build a plurality of buffers onto at least one high-performance storage including:
parsing the dataset to determine tier locations for the physical data in the dataset,
selecting lower-tiered data from the physical data in the dataset;
creating the plurality of buffers in the high-performance storage tier,
determining the shadow mapping for the lower-tiered data placed in the plurality of buffers, wherein the shadow mapping includes pointers to the plurality of buffers storing the lower-tiered data, and
copying the physical data onto the plurality of buffers;
reference a shadow mapping to locate physical data from the dataset stored on a first buffer from the plurality of buffers;
migrate the physical data from the first buffer to a migration destination; and
deallocate the first buffer to allow allocation of additional physical data onto to the first buffer for migration.

14. The computer program product of claim 13, wherein a number of buffers created is determined by a ratio of a read speed of the high-performance storage tier and a read speed of a lower-performance storage tier.

15. The computer program product of claim 13, wherein the shadow mapping includes references to the physical data copied onto the plurality of buffers.

16. The computer program product of claim 13, wherein the instructions to cause the processor to copy the lower-tiered data comprises instructions to copy the lower-tiered data onto each of the buffers in parallel.

17. The computer program product of claim 13, further comprising instructions to cause the processor to:
copy the additional physical data to be migrated onto the first buffer; and
migrate the physical data stored in a second buffer referenced by the shadow mapping.

18. The computer program product of claim 13, further comprising instructions to cause the processor to:
transmit a completion command to a host upon determining the physical data in the dataset is completely transferred.

* * * * *